Figure 1:
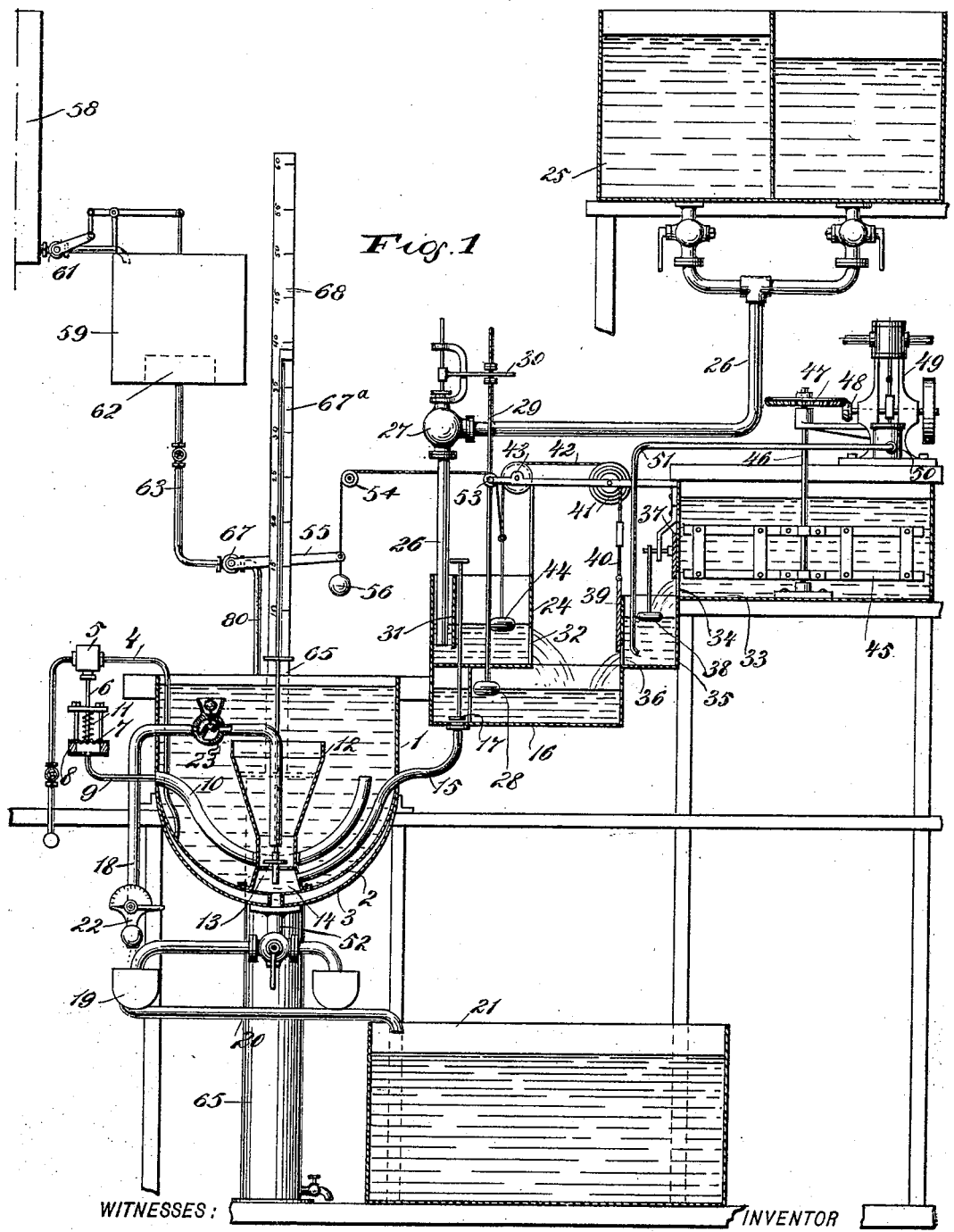

No. 705,924. Patented July 29, 1902.
J. E. HATTON.
APPARATUS FOR DEFECATING LIQUIDS.
(Application filed Aug. 1, 1901.)

(No Model.) 2 Sheets—Sheet 1.

WITNESSES: INVENTOR
Joseph E. Hatton.
BY
ATTORNEYS

No. 705,924. Patented July 29, 1902.
J. E. HATTON.
APPARATUS FOR DEFECATING LIQUIDS.
(Application filed Aug. 1, 1901.)
(No Model.) 2 Sheets—Sheet 2.
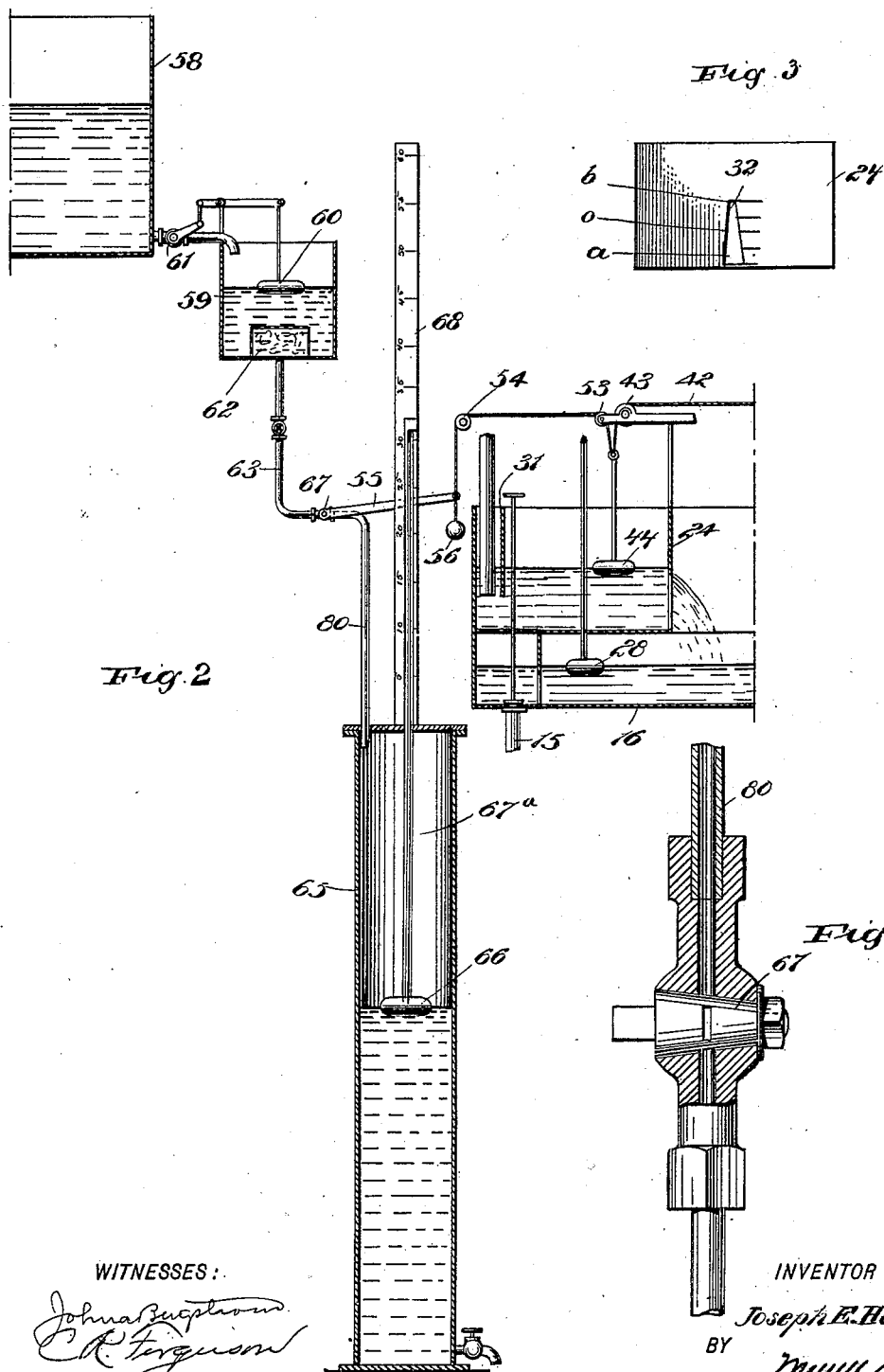

UNITED STATES PATENT OFFICE.

JOSEPH E. HATTON, OF SANTO DOMINGO, SANTO DOMINGO.

APPARATUS FOR DEFECATING LIQUIDS.

SPECIFICATION forming part of Letters Patent No. 705,924, dated July 29, 1902.

Application filed August 1, 1901. Serial No. 70,563. (No model.)

*To all whom it may concern:*

Be it known that I, JOSEPH E. HATTON, a subject of the King of Great Britain, and a resident of San Isidro Estate, Santo Domingo city, Santo Domingo, have invented a new and Improved Apparatus for the Defecation of Liquids, of which the following is a full, clear, and exact description.

This invention relates to improvements in apparatus for the defecation or purification of liquids, such as cane-juice; and the object is to provide an apparatus of this character by means of which the work done will be automatic, thorough, and continuous, and, further, to provide means for regulating and maintaining a uniformity of heat while the work is progressing and also to regulate the alkalization of the liquid.

I will describe an apparatus for the defecation of liquids embodying my invention and then point out the novel features in the appended claims.

Reference is to be had to the accompanying drawings, forming a part of this specification, in which similar characters of reference indicate corresponding parts in all the figures.

Figure 1 is a sectional elevation of an apparatus embodying my invention. Fig. 2 is a sectional elevation of a measuring device employed. Fig. 3 is a front view of the liquid-measuring tank, and Fig. 4 shows a form of valve used in connection with the measuring device.

The apparatus comprises a heating vessel 1, having a double bottom 2 3, the space between the bottoms 2 and 3 being designed to receive a heating medium—such, for instance, as steam. The steam or other heating medium is supplied through a pipe 4, having a valve arranged in a casing 5 and designed to be automatically operated to regulate the degree of heat. As a means for operating the valve in the casing 5 the stem 6 of said valve is connected with a flexible diaphragm 7, mounted in a casing 8, and from this casing a pipe 9 leads to a connection with a pipe 10, arranged in the heating vessel. This pipe 10 is designed to hold an expansive liquid—such, for instance, as water. When the liquid in the vessel 1 reaches a certain temperature, the water in the pipe 10 becomes heated and upon expanding forces the diaphragm 7 upward, closing the valve, and consequently shutting off the supply of heating medium. As the temperature in said vessel 1 lowers, the diaphragm 7 will be moved downward by means of a spring 11 and then open the valve to admit a new supply of heating medium.

Arranged within the heating vessel and supported on the bottom 2 is a funnel-shaped separator 12, having an opening in its lower wall controlled by a valve 13, the stem of which extends upward above the top of the heating vessel, where it is provided with a handpiece, so the said valve may be readily opened or closed, as required, the said valve being closed while the liquid is being siphoned off. Below the opening in the bottom of the separator is a chamber 14, with which a liquid-supply pipe 15 communicates. This supply-pipe leads from a trough 16, and the communication between said trough 16 and the pipe 15 is controlled by a valve 17. It may be here stated that while I have shown but one heating vessel it is designed that a series of the same shall be employed and all supplied with liquid from the trough 16.

A siphon 18 has one end extended into the separator 12 and nearly to the bottom thereof. The outer end of this siphon is arranged to discharge liquid into a suitable receiver, such as a trough 19, from which a pipe 20 leads to a receiving-tank 21 for the defecated liquid. The outer lower end of the siphon 18 is provided with a regulating-valve 22, so as to regulate the amount of liquid discharged through the same. To automatically stop the flow of liquid through the siphon 18, I employ a valve in the valve-casing 23, which is automatically controlled by a float in the liquid in the heating vessel, the said float being in the funnel-shaped upper end of the casing—that is, when the liquid rises to a certain point in the vessel 1 the valve will be moved to an open position, allowing the liquid to escape, but when the liquid falls below a certain point the valve will be closed, thus cutting off the flow of liquid through the siphon.

Arranged above the trough is a measuring-tank 24, the said measuring-tank being supplied with liquid from a supply-tank 25 through a pipe 26, in which is arranged a valve 27, automatically controlled by the rise and fall of liquid in the trough 16 as it is desired to maintain the liquid in said trough 16 at a uniform level corresponding with that in the heating vessel. The valve 27 is controlled by means of a float 28, having a stem 29, connecting with an arm 30, attached to the stem of the valve. This arm 30 engages with the stem 29 between two adjusting-nuts, as clearly shown in the drawings, so that the opening and closing of the valve may be regulated as desired. The tank 25 is divided into two compartments, and from each compartment valved pipes lead to the supply-pipe 26. By this arrangement while liquid is discharged from one compartment of said tank the other compartment may be washed and charged with liquid. The measuring-tank 24 is provided with a partition 31, which extends nearly to the bottom thereof. The outlet end of the pipe 26 extends between said partition and a wall of the tank. The opposite wall of the tank 24 is provided with a vertical outlet-slot 32, through which the liquid discharges in the form of a cascade into the trough 16. The quantity of liquid passing through the tank 24 will be in direct proportion to the height of the liquid in the slot 32.

Arranged above the trough 16 is a tank 33 for containing milk of lime or other alkalizing liquid. The liquid from the tank 33 discharges through an opening 34 into an aerating vessel 35, having a vertical slot 36 for the discharge of the milk of lime into the trough 16. The flow of liquid through the opening 34 is controlled by a gate-valve 37, which is connected to a float 38 in the aerating vessel 35, and the outlet from said vessel 35 is controlled by a gate-valve 39, from which a rope or similar device 40 extends to a step-pulley 41. Attached to the larger diameter of said pulley is a cord 42, which extends over a pulley 43 and has a connection with a float 44 in the measuring-tank. By adjusting the rope or cord 42 on the step-pulley the degree of opening or outlet at 35 may be regulated as desired, and obviously the rise and fall of the float 44 will more or less move the valve 39, thus controlling the outlet 36. The milk of lime in the tank 33 is constantly agitated by a stirrer 45, connected to a rod 46, having at its upper end a gear-wheel 47, meshing with a pinion 48, driven by an engine 49. This engine 49 also operates an air compressor or pump 50, from which a pipe 51 leads into the aerating vessel 45, the purpose of which is to further agitate the lime.

By the arrangement of automatically-operated valves 37 and 39 the supply of alkalizing liquid is kept under complete control and at all times the required amount thereof is supplied in proportion to the liquid to be defecated, and, as before stated, the temperature in the heating vessel 1 must be maintained at about 210° Fahrenheit by means of the controlling-valve in the casing 5.

In operation the liquid to be defecated passes through the pipe 26 and into the measuring-tank 24 rearward of the partition 31, the liquid passing underneath this partition and out through the opening 32 into the trough 16, from which it discharges through the pipe 15 under the separator 12. The lighter particles of the liquid will rise to the top, and the scum forming thereon, which may rise several inches above the heater, may be scraped off into a car or other suitable vessel. At the time of discharging the liquid by the siphon and lowering the level of the liquid in the vessel 1 the float 28 will lower to operate the valve in the casing 27 to allow a fresh supply of liquid to pass into the receiving-tank. Thus it will be seen that the supply of material is automatic and absolutely continuous. The inlet-pressure being greater than the pressure in the heating vessel and the siphon being closed, the lighter particles will be forced to the top and not enter the siphon because of the air-pressure therein. While liquid is entering the vessel it will pass over the top of the part 12 and by engaging against its inner and outer sides will become thoroughly separated or broken up, and by the heat applied the turbid matter will be carried to the top in the form of scum, leaving the clear liquid to be drawn off upon opening the siphon.

In connection with the apparatus I employ a device for measuring the quantity of liquid passing from the tank 24. The quantity of liquid passing from the tank will be in proportion to the height of liquid discharging through the slot 32. This slot is trapeziform with the greater width at the bottom, so as to compensate for the difference of head of liquid—that is, when the liquid passes at the height $a$ the head will be $a-o$; when passing at the point $b$ the head at $o$ will be $o-a + a-b$. Therefore to establish the same proportion the slot must be shaped as shown.

As the liquid is higher or lower in the tank 24 the float 44 rises or falls in proportion to the quantity of liquid passing out. Attached to the stem of the float 44 is a steel wire or the like, which passes over pulleys 53 and 54 and is connected to the end of a lever 55, to which is also attached a weight 56. When the float rises, the weight 56 moves the lever down to open the valve 67, to the stem of which the lever is attached. When the float lowers, it lifts the weight 56, and the lever closes the valve 67. Therefore the quantity of liquid passing through the valve 67 will be in proportion to the quantity of liquid passing through the tank 24. The valve 67 has a slot of uniform width arranged at right angles to the axis of the plug, so that the quantity of liquid passing through the slot will be more or less in proportion as the slot is more or less opened to the pipe 80, in which the valve 67 is placed and which receives liquid, such as water, from a tank 58. From the tank 58 the water passes to a supplemental tank 59 through a cock 61, the opening of which is controlled by a float 60 in the tank 59, thus maintaining a uniform pressure or head in the tank 59. In the tank 59 is a filter 62, with which a pipe 63 communicates and which leads to the pipe 80. The water passing through the valve 67 enters a cylinder 65, closed at the top and bottom. In the cylinder 65 is a float 66, having a rod 67ª movable through an opening in the top closure of the cylinder and along a graduated scale 68. As the float and rod rise the quantity of liquid passing from the tank 24 is indicated by the scale 68. For example, when one thousand gallons have passed through the opening 32 the end of the rod 67ª will rise one inch, indicating one inch of water in the cylinder 65.

Having thus described my invention, I claim as new and desire to secure by Letters Patent—

1. In an apparatus for the defecation of liquids, a heating vessel, means for supplying heat thereto, a separator arranged within the vessel, a siphon leading from said separator, a supply-tank, and means for automatically controlling the supply of liquid from said tank to the heating vessel, substantially as specified.

2. An apparatus for the defecation of liquids, comprising a heating vessel, means for supplying a heating medium thereto, means for automatically controlling the supply of heating medium, a separator in the vessel, and an automatically-controlled siphon leading from said separator, substantially as specified.

3. An apparatus for the defecation of liquids, comprising a heating vessel, means for supplying a heating medium thereto, a supply vessel for supplying liquid to the heating vessel, a supply-pipe leading to the bottom of the heating vessel, an alkalization-tank, and means for automatically controlling the supply of alkalizing medium to the liquid to be defecated, substantially as specified.

4. An apparatus for the defecation of liquids, comprising a heating vessel having a double bottom, a pipe for conveying the heating medium into the space between the bottoms, a pipe extended into the vessel and adapted to contain an expansive medium, a diaphragm arranged to receive the pressure of said expansive medium, a connection between said diaphragm and a valve in the heat-supply pipe, and a liquid-supply pipe leading into the vessel, substantially as specified.

5. An apparatus for the defecation of liquids, comprising a heating vessel, a separator arranged in the vessel and having a valve-controlled opening in its lower portion, a supply-pipe leading below the separator into the heating vessel, a siphon having one member extended into said separator and nearly to the bottom thereof, an automatically-controlled valve in said siphon, and a regulating-valve on the outer section of said siphon, substantially as specified.

6. An apparatus for the defecation of liquids, comprising a heating vessel, means for automatically controlling a supply of heating medium to the vessel, a supply-tank having communication with the vessel, a tank for controlling an alkalizing medium, and means for automatically controlling the supply therefrom, substantially as specified.

7. An apparatus for the defecation of liquids, comprising a heating vessel, means for supplying heat thereto, a supply-tank having communication with the heating vessel, a tank for containing an alkalizing medium, an aerating vessel for receiving the said agent from said tank, an air-compressor, and a pipe leading from said compressor into said aerating vessel, substantially as specified.

8. An apparatus for the defecation of liquids, comprising a supply-tank, a measuring-tank having a vertical partition leading nearly to the bottom thereof and also having a vertical outlet-slot in one of its walls, a pipe leading from the supply-tank into the receiving-tank rearward of the partition, an automatically-controlled valve in said pipe, a trough into which the receiving-tank discharges, a supply-tank for an alkalizing medium discharging into said trough, and a heating vessel receiving the liquid from said trough, substantially as specified.

9. An apparatus for the defecation of liquids, comprising a heating vessel, a supply-tank having communication with said heating vessel, a tank for an alkalizing medium, means for automatically controlling the discharge of said medium from the tank, and a stirrer operating in the tank, substantially as specified.

In testimony whereof I have signed my name to this specification in the presence of two subscribing witnesses.

JOSEPH E. HATTON.

Witnesses:
 JNO. M. RITTER,
 F. W. HANAFORD.